United States Patent [19]

Gavagan et al.

[11] Patent Number: 4,482,137
[45] Date of Patent: Nov. 13, 1984

[54] COMPARTMENT SHADE

[75] Inventors: James A. Gavagan, Centerline; Carl M. Petersen, III, Drayton Plains; Michael J. Ray, Southfield, all of Mich.

[73] Assignee: Irvin Industries, Inc., Mich.

[21] Appl. No.: 448,617

[22] Filed: Dec. 10, 1982

[51] Int. Cl.³ .............................................. E06B 9/208
[52] U.S. Cl. ...................................... 267/157; 160/315
[58] Field of Search ................... 160/315, 318, 323 R; 267/155–157; 296/37.16

[56] References Cited

U.S. PATENT DOCUMENTS 4,139,231 2/1979 Lang et al. ................. 296/37.16
4,222,601 9/1980 White et al. ................. 296/37.16
4,228,843 10/1980 Kobayashi ................. 160/315 X Primary Examiner—Duane A. Reger

[57] ABSTRACT

A trunk shade for an automotive luggage compartment having a central torque tube removably installed and held against rotation in fixed mounting brackets in which a torsional windup spring accommodating shade extraction and retraction has a prewind retention feature provided by an axial lead screw for a clutch dog which reaches a limit stop at a prewound retracted condition unaffected when the shade is removed from the mounting brackets. Optionally, a stop may also be provided at the other end of its travel to limit extraction of the shade. Helical torsional windup springs, of either compression or extension type, are adapted to take up mounting end clearance and in other respects eliminate shade rattle.

12 Claims, 10 Drawing Figures

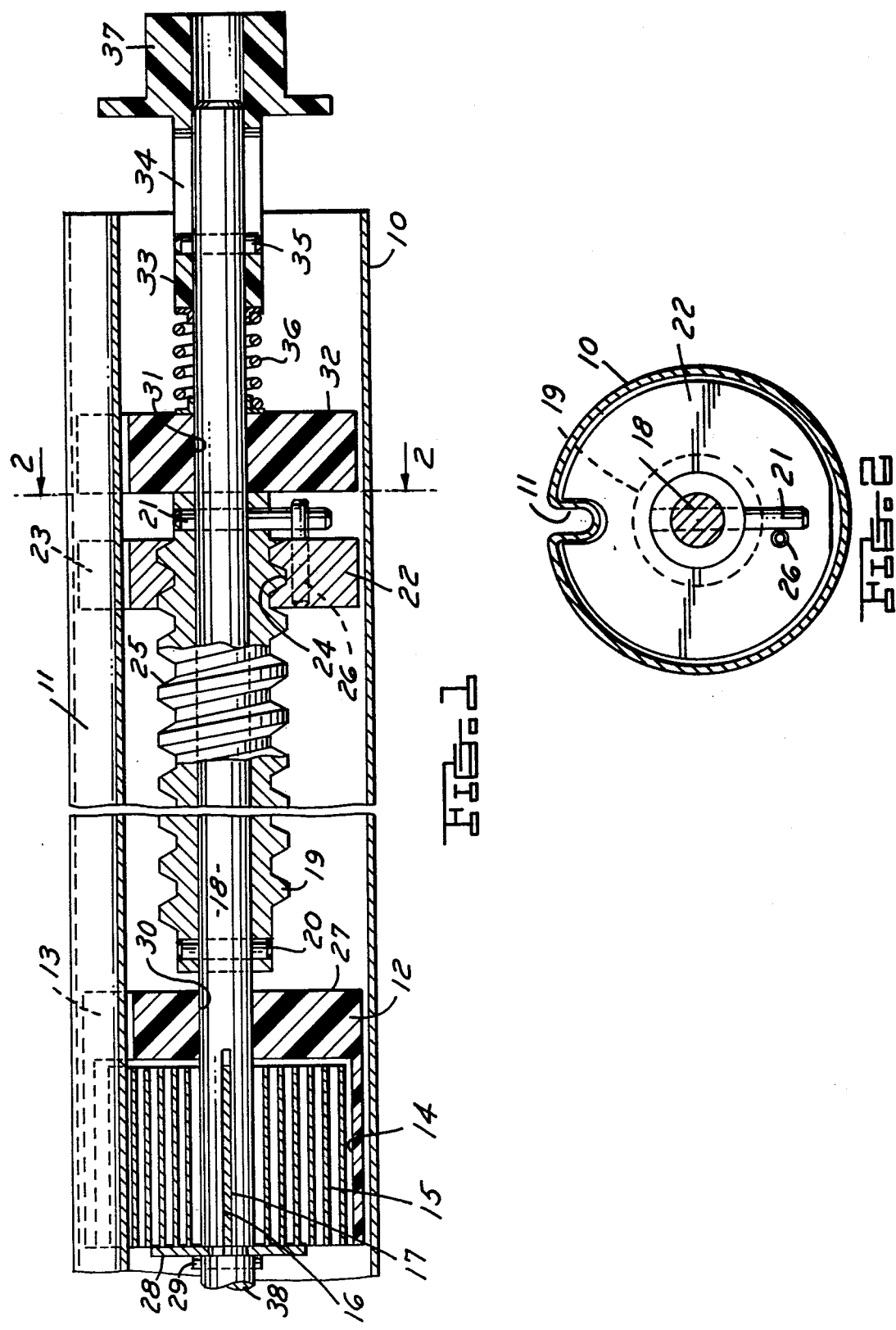

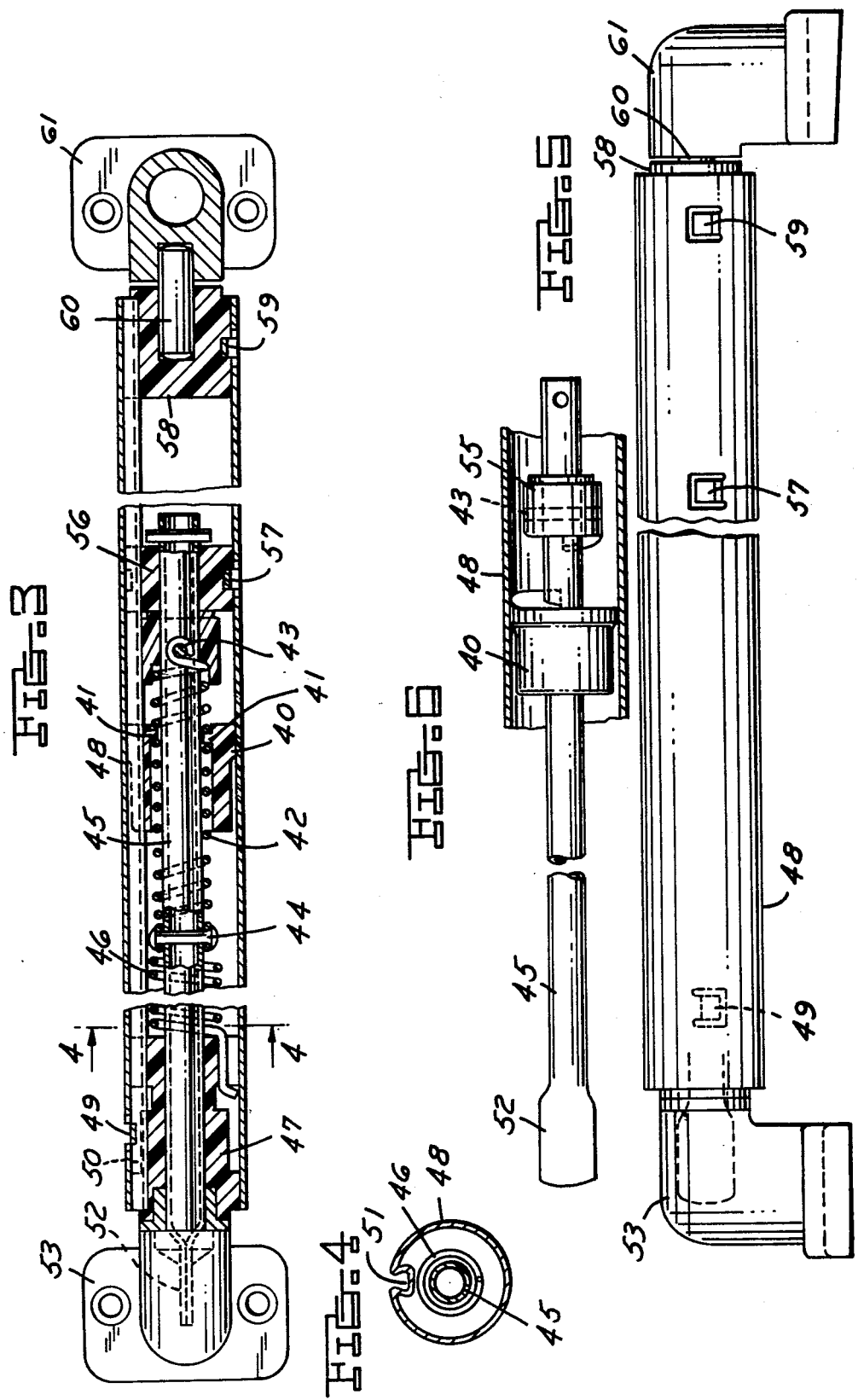

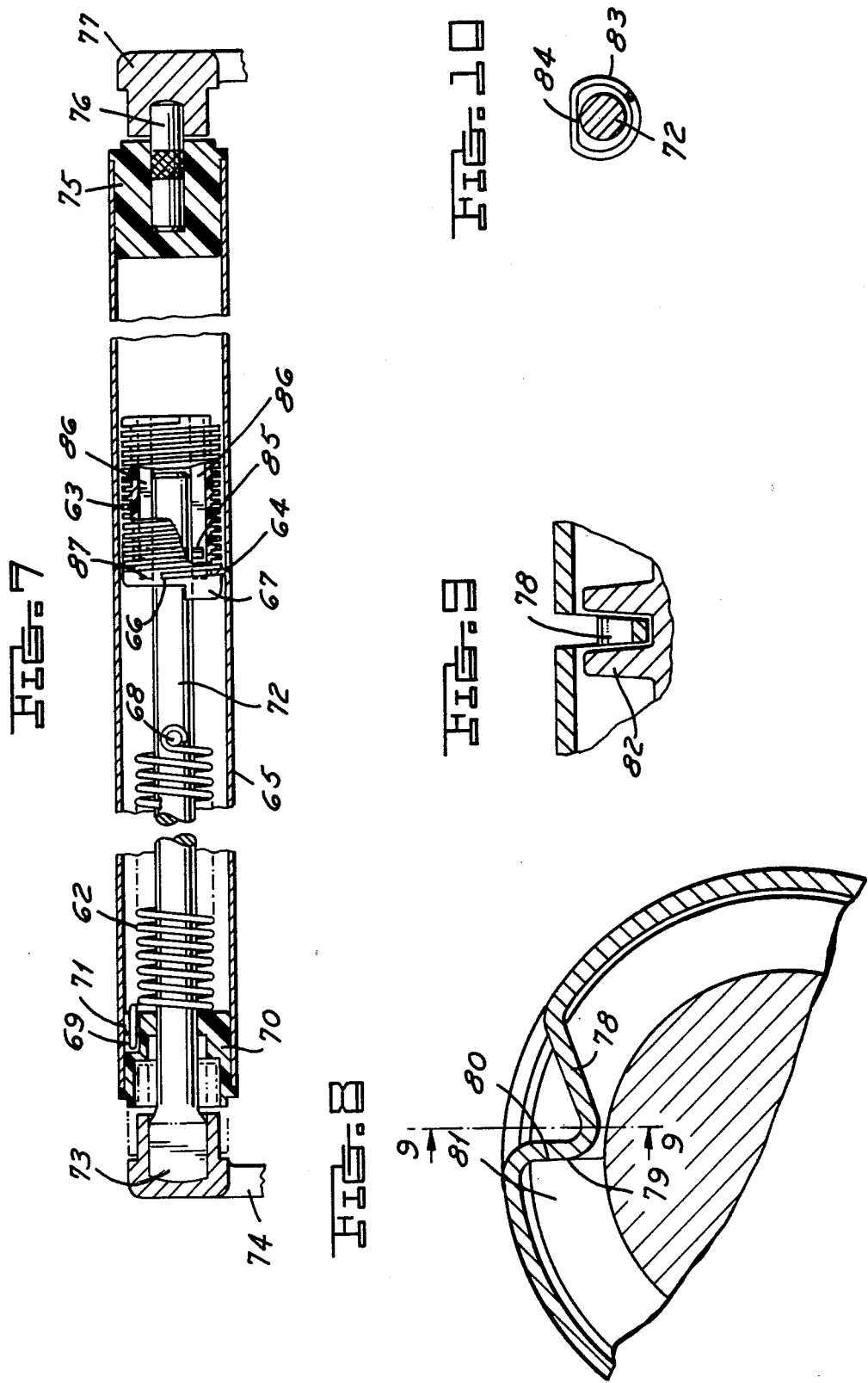

4,482,137

COMPARTMENT SHADE

BACKGROUND OF THE INVENTION

Trunk compartment shades currently in use to conceal luggage or packages, particularly in hatchback models where large window visibility into the compartment is otherwise available, normally incorporate windup springs which tighten during extraction and require some prewind at the retraction limit of the shade. Mounting brackets may be attached to the seatback adjacent the luggage compartment or to side panels of the vehicle which in either case involve some tolerance variation in the distance between brackets. This may result in looseness and rattling of the shade in the absence of some provision to take up clearance incident to spacing variations. Auxiliary compression springs in the mounting hardware are known in the art for overcoming this problem.

Provision for removal of the shade without loss of prewind is another practical requirement which has been solved in a prior art construction through use of a spring loaded end cap which had to be compressed for installation and upon removal would extend axially with inner engagement of elements preventing loss of prewind when removed from the mounting brackets. Such solution is subject to accidental compression of the end cap, as by standing the shade on end, which could lead to loss of prewind.

The closest prior art patents of which applicants and their attorney are aware include the following:

U.S. Pat. No. 4,127,301, Nov. 28, 1978; U.S. Pat. No. 4,139,231, Feb. 13, 1979; U.S. Pat. No. 4,220,367, Sept. 2, 1980; and U.S. Pat. No. 4,222,601, Sept. 16, 1980.

SUMMARY OF THE INVENTION

Disclosed herein are three preferred embodiments of a compartment shade wherein assembled prewind is retained within the shade roller tube without involving an exterior end cap which may be accidentally displaced to release the prewind. In each of the embodiments an internal threaded element axially displaced by shade extraction and retraction reaches a stop position upon retraction to a preset, prewound condition. Optionally a similar stop may be employed at the other extremity of axial travel in order to limit extraction of the shade to any desired length.

A first embodiment employs a clock type of windup spring, an externally threaded tube for axial displacement of the clutch dog and a compression spring for take-up of tolerance clearance between the mounting brackets.

In a second embodiment the windup spring is provided with an open coil installed under compression adapted to load bracket engaging ends to take up any tolerance clearance. An extension of such spring, or separate open coil spring, is adapted to serve as a helical thread for an internally threaded dog element axially displaced by shade extraction or retraction. In this embodiment the compression spring mounted on a central torque tube is of a length exceeding column stability so as to assume a sinusoidal shape filling up the available restraining space thereby preventing spring rattle. The internal torque tube on which the spring is mounted is optionally constructed with limited torsional rigidity to provide a shock absorbing feature for unrestrained retraction to the stop position of the clutch.

A third embodiment employs a closely wound tension and torsion spring extended in mounting to outwardly spring load bracket engaging ends to take up any tolerance clearance variations. In this case the axially displaceable prewind retention element is formed with an external thread engaging an inwardly extending tang formed in the shade windup tube with a keyway provision axially engaging an inner reaction tube. In order to avoid spring rattle between the extension spring and its mounting tube, the spring may be wound on an mandrel having a flat dimension to provide a single coil opening exceeding the center tube diameter under full shade extension but with spacing between opposed flats in the fully retracted condition of the spring less than the diameter of said tube whereby anti-rattle spring contact with the tube will be assured without any possibility of frictional binding.

BRIEF DESCRIPTION OF THE DRAWINGS

FIG. 1 is a sectional side elevation of a first embodiment of compartment shade roller constructed in accordance with the present invention;

FIG. 2 is a sectional view taken along the line 2—2 of FIG. 1;

FIG. 3 is a sectional side elevation of a second embodiment;

FIG. 4 is a sectional end view taken along the line 4—4 of FIG. 3;

FIG. 5 is a plan view of the shade roller illustrated in FIG. 3;

FIG. 6 is a partially sectioned fragmentary view illustrating the mating clutch dog and clutch stop;

FIG. 7 is a sectional plan view of a third embodiment of the present invention;

FIG. 8 is an enlarged fragmentary section showing an optional construction for a thread engaging tang stop;

FIG. 9 is a fragmentary sectional view taken along the line 9—9 of FIG. 8.

FIG. 10 is a fragmentary sectional view of center tube and spring wound with a flat side on each coil.

DESCRIPTION OF THE PREFERRED EMBODIMENTS

With reference to FIGS. 1 and 2, the first embodiment shade roller assembly comprises outer tube 10 having longitudinal slot 11 for engaging the end of a flexible shade, not shown, to be wound on tube 10 for extension and retraction. Spring housing 12 is provided with slotted recess 13 to engage the inward projection of slot 11 formed in tube 10 and with spring cavity 14 to accommodate coiled leaf spring 15 having an outer end anchored to the outer shell of the spring housing 12 and inner end 17 drivingly engaging slot 16 in center rod 18 on which threaded tube 19 is pinned at 20 and 21. Clutch dog 22 slotted at 23 to engage the inward projection of slot 11 in tube 10 is provided with internal threads 24 to engage external threads 25 of threaded tube 19 and upon rotation of outer tube 10 relative to rod 18 in a shade extending direction is adapted to lead clutch dog 22 and its stop pin 26 away from the extension of stop pin 21. Upon retraction rolling of outer tube 10 relative to rod 18, clutch dog 22 will rotate and move axially to the limit established by inter-engagement of stop pins 26 and 21. Optionally, pins 20 and 26 may be provided with extensions similar to those shown for stop pin 21 to limit extraction of the shade as well as retraction; or inner surface 27 of spring housing 12 backed up by washer 28 and pin 29 may serve as a limit for axial travel of clutch dog 22 in extracting the shade.

Bore 30 in spring housing 12 together with bore 31 in bushing 32 serve as bearings for rod 18 having sleeve 33 slotted at 34 to engage cross pin 35 spring loaded at 36 to urge adapter 37 into reactive engagement with its mounting bracket, not shown, the other end 38 of rod 18 serving to engage the other mounting bracket, not shown, whereby clearance variations in the space in between mounting brackets may be accommodated with the shade axially spring loaded to avoid rattling.

In assembling the shade roller, clutch dog 22 is run against stop pin 21 and partially inserted in tube 10 whereupon spring housing 12 is manually prewound in a retraction direction before it is inserted to engage the extension of slot 11 in outer tube 10. Such prewind will accordingly be retained upon removal of the compartment shade from its mounting brackets until restored to its operative position.

With reference to FIGS. 3-6 the second embodiment employs clutch dog 40 having an internal thread 41 adapted to engage helical convolutions of open spring 42 riveted at 43 and 44 to center tube 45. Torsion spring 46 is compressively mounted to react against rivet 44 and torque bearing 47 slidable axially relative to outer tube 48 within limits established by tang 49 projecting within slot 50 and retained against relative rotation through longitudinal slotted engagement with inward projection 51 of outer tube 48. As illustrated in FIG. 6, clutch dog 40 is adapted to engage stop dog 55 to limit retraction; and bushing 56, axially fixed by tang 57 to outer tube 48, is adapted to move with the outer tube and its outer bushing 58 axially fixed by tang 59 to extend pin 60 into engagement with support bracket 61 under the compressive loading of spring 46.

As in the first embodiment, assembly with permanent prewind is effected by inserting clutch 40 fully wound against retraction stop, prewinding torque bearing 47 prior to its insertion, and finally deflecting tang 49 to permanently retain torque bearing 47 against removal.

With reference to FIGS. 7-10 the third embodiment employs a further modification characterized primarily by close wound extended torsion spring 62 and externally threaded clutch element 63 engaged by tang 64 pressed in from outer tube 65. Thread end 66 in plastic clutch 63 serves as the end stop through engagement with tang 64 at the fully retracted prewind position. Optionally, dog 67 may be provided at the end of clutch 63 to engage a tang, not shown, pressed in from tube 65 at assembly to provide an extension limit for the shade.

End 69 of extension spring 62 is anchored to torque bearing 70 fixed at assembly against both axial and rotational displacement relative to outer tube 65, as by suitable engagement of tang 71, and axial tension of spring 62 will serve to draw center tube 72 with flattened ends 73 into reactive engagement with bracket 74 while displacing outer tube 65 with support tube insert 75 and end pin 76 into engagement with mounting bracket 77.

With reference to the enlarged fragmentary FIGS. 8 and 9, an optional construction for the tang stop is illustrated wherein tang strip 78 is pierced and depressed to a configuration where vertical extension 79 engages shoulder 80 formed at the end of the external thread of clutch 81. With such construction any desired width of thread 82 and tang 78 may be employed.

With reference to FIG. 10, an optional extension torsion spring 83 may be wound on a mandrel providing flat portion 84 on each coil dimensioned to provide individual coil clearance relative to center tube 72 under full extension of the shade. By providing an inner chord height for flat 84 greater than half the diametral spring coil clearance relative to center tube 72 when the shade is fully retracted, helical longitudinal anti-rattle spring contact is assured between spring and center tube without any possibility of frictional binding in any single individual coil under both fully extended and fully retracted conditions of the shade.

In assembling the compartment shade of FIG. 7 a sub-assembly of interior clutch 63, center tube 72, spring 62, rivet 68 and torque bearing 70 is first made with cross-pin 85 engaging keyway slots 86 formed in the inner wall of clutch 63 terminating at a shoulder end 87. The sub-assembly is dropped into the outer tube and while held in vertical position tube extension 73 is rotated to engage threaded clutch 63 with tang 64 until the tang reaches the extremity of the end of thread 66. Prior to inserting torque bearing 70 into the end of tube 65, it is next rotated several turns to prewind spring 62 to a desired extent whereupon torque bearing 70 is inserted and staked permanently in position by deflection of outer tube tang 71.

With reference to each of the embodiments a center tube may be employed having limited torsional rigidity capable of providing a shock absorbing feature so that release of the shade under a fully extended condition resulting in accelerating speed of windup suddenly interrupted by stop engagement will absorb the shock by torsionally deflecting the tube thereby preventing damage to the parts.

We claim:

1. Compartment shade comprising tube for rolling and unrolling shade between retracted and extended positions, means including mounting brackets supporting said tube in rotational operative position, torsional spring means transmitting shade windup torque between said supporting means and said tube, means for establishing prewind of said spring means in the retracted position of said shade, means accommodating removal of said tube from said mounting brackets, and means for permanently retaining said prewind unaffected by shade removal comprising axially displaceable means completely enclosed within said tube responsive to retractional rotation, and stop means engaged thereby for arresting retraction at said prewound condition.

2. Compartment shade as set forth in claim 1 wherein said support means includes bearing and torsional reactive bracket engaging means.

3. Compartment shade as set forth in claim 2 wherein said torsional spring means comprises circumferentially wound leaf spring having an outer end anchored to said tube and an inner end anchored to said supporting means.

4. Compartment shade as set forth in claim 2 wherein said torsional spring means comprises a helical spring having axially spaced coils compressed in installation with bracket connecting means to take up variations in the spacing of said mounting brackets.

5. Compartment shade as set forth in claim 2 wherein said torsional spring means comprises an extension spring axially stretched during installation with bracket connecting means to take up variations in the spacing of said mounting brackets.

6. Compartment shade as set forth in claim 5 wherein said extension spring is wound with a flat on one side, and said supporting means includes a cylindrical element extending through said spring, said flat being proportioned to provide anti-rattle contact with said cylindrical element limited to one side of any individual coil.

7. Compartment shade as set forth in claim 1 wherein said axially displaceable means comprises rotatable clutch means engaging a threaded element and a cooperating stop.

8. Compartment shade as set forth in claim 7 wherein said clutch means engages a threaded element comprising a helically wound spring coil.

9. Compartment shade as set forth in claim 7 wherein said clutch means comprises an externally threaded element engaging a tang displaced from said tube.

10. Compartment shade as set forth in claim 7 wherein said clutch means comprises an externally threaded element engaging a tang displaced from said tube, said tang being formed by piercing a circumferential slot in said tube.

11. Compartment shade as set forth in claim 7 including shock absorbing means for said cooperating stop.

12. Compartment shade as set forth in claim 7 including shock absorbing means for said cooperating stop comprising a central reaction tube having limited torsional rigidity serving as an anchor for said cooperating stop.

* * * * *